United States Patent
Bauer

(10) Patent No.: US 7,462,331 B2
(45) Date of Patent: Dec. 9, 2008

(54) OXIDATION-CATALYTIC SEPARATION DEVICE

(75) Inventor: Heinz Bauer, Munich (DE)

(73) Assignee: Bauer Comp Holding AG, Munich (DE)

( * ) Notice: Subject to any disclaimer, the term of this patent is extended or adjusted under 35 U.S.C. 154(b) by 200 days.

(21) Appl. No.: 11/122,226

(22) Filed: May 5, 2005

(65) Prior Publication Data

US 2005/0274260 A1    Dec. 15, 2005

(30) Foreign Application Priority Data

May 5, 2004    (DE)    ........................ 10 2004 022 092

(51) Int. Cl.
    *B01D 53/44*    (2006.01)
    *B01D 53/88*    (2006.01)
(52) U.S. Cl. .................. 422/171; 422/191; 502/527.23
(58) Field of Classification Search .................. 96/131, 96/132; 502/100, 439, 527.23; 422/169, 422/170, 171, 188, 189, 190, 191; 60/299
    See application file for complete search history.

(56) References Cited

U.S. PATENT DOCUMENTS

| | | | | |
|---|---|---|---|---|
| 3,907,511 A | * | 9/1975 | Forbes et al. ................. | 422/191 |
| 4,023,360 A | * | 5/1977 | Wossner et al. ............... | 60/277 |
| 4,032,310 A | * | 6/1977 | Ignoffo ........................ | 422/170 |
| 4,119,526 A | * | 10/1978 | Peters et al. ................... | 208/64 |
| 4,372,920 A | * | 2/1983 | Zardi .......................... | 422/148 |
| 5,195,063 A | * | 3/1993 | Moriya ........................ | 368/85 |
| 5,403,559 A | * | 4/1995 | Swars .......................... | 422/180 |
| 5,484,575 A | * | 1/1996 | Steenackers ................. | 422/176 |
| 6,192,675 B1 | * | 2/2001 | Hirota et al. .................. | 60/286 |
| 6,294,141 B1 | * | 9/2001 | Twigg et al. ............. | 423/213.7 |
| 2002/0055658 A1 | * | 5/2002 | Wachs ........................ | 568/487 |
| 2003/0012711 A1 | * | 1/2003 | Harkins et al. .............. | 422/190 |
| 2004/0102530 A1 | * | 5/2004 | Borsa et al. ................. | 518/704 |
| 2004/0265224 A1 | * | 12/2004 | Papavassiliou et al. ...... | 423/651 |

* cited by examiner

*Primary Examiner*—Frank M Lawrence
(74) *Attorney, Agent, or Firm*—David S. Safran; Roberts Mlotkowski Safran & Cole, P.C.

(57) ABSTRACT

An oxidation-catalytic separation device for removing oil and volatile organic components from pressurized gases of a compression system has, proceeding from the inflow side of a tank which contains an oxidation catalyst, at least two chambers with different diameters and/or lengths. In this way, the chambers can also be matched to the desired main functions with respect to geometrical conditions, especially a first chamber with a smaller diameter being intended for aerosol separation, and a second chamber of greater diameter being intended for residual vapor catalysis. Even for variably operated compression systems, the pressurized gases can be reliably purified using this oxidation-catalytic separation device such that the required and desired degree of purity of a high-quality pressurized gas is obtained.

8 Claims, 1 Drawing Sheet

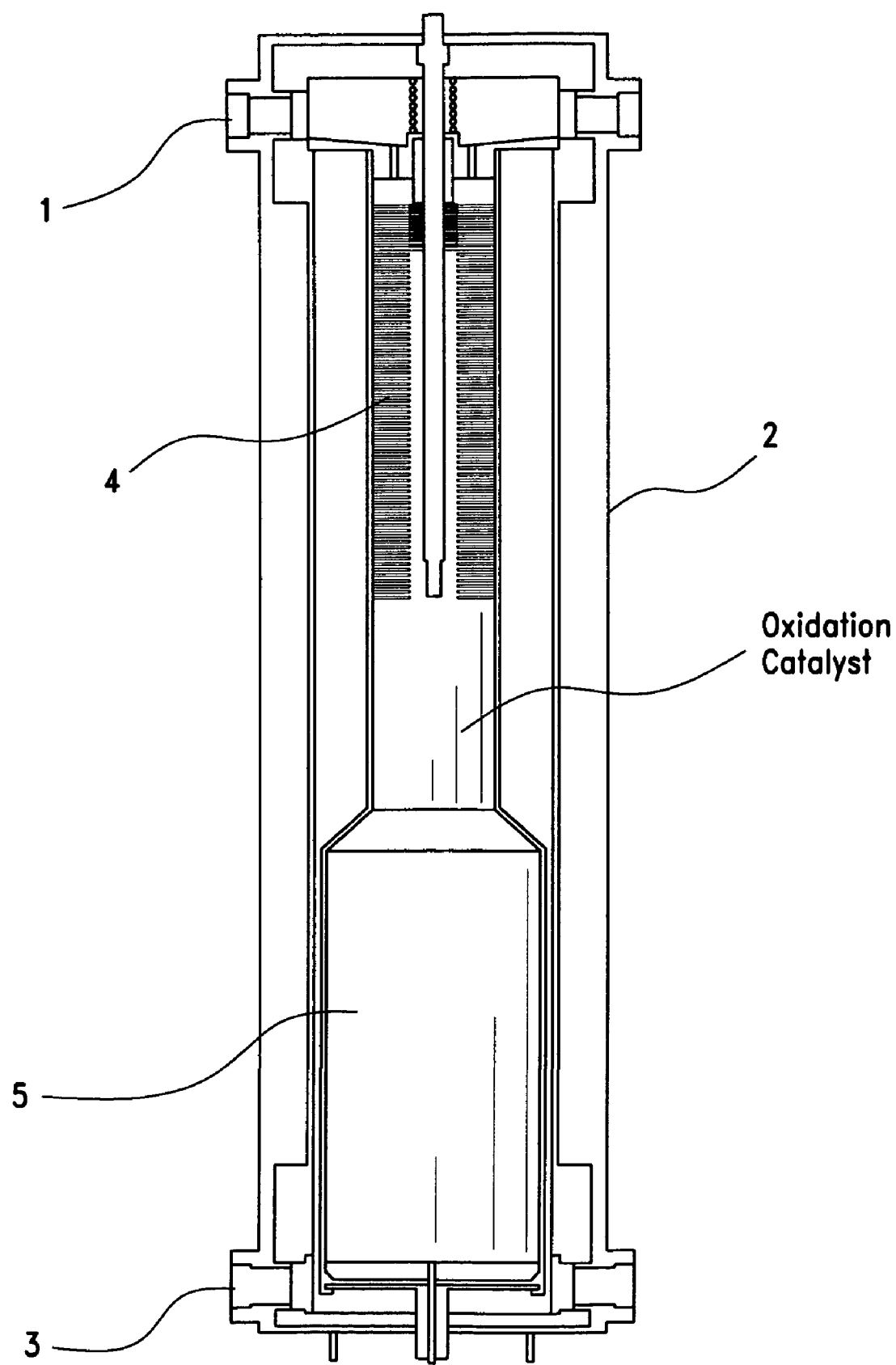

OXIDATION-CATALYTIC SEPARATION DEVICE

BACKGROUND OF THE INVENTION

1. Field of Invention

The invention relates to an oxidation-catalytic separation device for removing oil and volatile organic components from pressurized gases of a compression system.

2. Description of Related Art

An oxidation-catalytic separation device of the aforementioned type conventionally has a tank which contains an oxidation catalyst and through which the pressurized gas flows, proceeding from the inflow side to the outflow side. To purify the pressurized gases, in the oxidation-catalytic separation device both the aerosols and also the vapors must be catalytically oxidized, for which a certain residence time and a certain velocity of the pressurized gases to be purified in the catalyst are required. If the necessary residence time is not reached, vaporous oils can remain in the pressurized gas flow and the desired and required purity cannot be maintained. If the necessary velocity is not reached, aerosols can pass through the catalyst bed so that, in the same way, the desired and required purity of the pressurized gas treated by means of oxidation-catalytic separation treatment is not achieved.

As long as the compression systems are working continuously in rated operation or uniform operation, the flow conditions of the pressurized gas flow can be matched in the tanks, which are usually made cylindrical, by suitable measures such that the desired degree of purity of the pressurized gas is achieved.

Currently, compression systems are often operated in different operating ranges depending on need, so that the flow amounts and velocities of the pressurized gases to be treated in the oxidation-catalytic separation device can change. In the case of such variable operation of a compression system, the desired separation of oil and volatile organic components from the pressurized gases poses problems since the flow conditions and operating conditions in the oxidation-catalytic separation device cannot be reliably matched to the changing operating conditions.

SUMMARY OF THE INVENTION

The invention is therefore directed at providing an oxidation-catalytic separation device of the initially mentioned type which also allows reliable use under variable operating conditions of a compression system.

In accordance with the invention, an oxidation-catalytic separation device for separating oil and volatile organic components from pressurized gases of a compression system is obtained that has a tank which contains an oxidation catalyst, and through which the pressurized gas flows, proceeding from the inflow side to the outflow side, the oxidation-catalytic separation device being characterized in that the tank comprises at least two chambers with different diameters.

Since the oxidation-catalytic separation device of the invention has at least two chambers with different diameters in which the oxidation-catalyst is located, the operating conditions and flow conditions in the oxidation-catalytic separation device can be reliably matched to changing flow conditions such that, even for a variable delivery amount of the compression system, the desired degree of purity of the generated pressurized gas is always reliably obtained at the output of the oxidation-catalytic separation device.

In particular, in the oxidation-catalytic separation device in accordance with the invention, the tank on the inflow side comprises a first chamber which has a smaller diameter and which is matched to the smallest pressurized gas throughflow and the slowest velocity, and connected to it is a second chamber with a larger diameter which allows the velocity to be slowed down.

Preferably, the design is such that the first chamber is intended mainly for aerosol separation from the compressed gas flow and the at least one additional chamber is intended mainly for residual vapor catalysis.

In this design, the first chamber of the tank in the entry area is set to the smallest throughput and thus the slowest velocity, so that effective aerosol separation is achieved there. In the second chamber with the larger diameter, then, the flow velocity can be further reduced to provide the necessary residence time for residual vapor catalysis in the oxidation-catalytic separation device. This chamber principle in accordance with the invention can also ensure reliable pressurized gas purification under variable operating conditions of the compression system so that, even under variable operating conditions, the required degree of purity of the compressed gas according to DIN-ISO 8573-1 class 1 can be achieved.

Preferably, the chamber arrangement in the oxidation-catalytic separation device of the invention can be designed to be replaceable as a cartridge system so that, if necessary, simple replacement is possible for changing the chamber system.

Other details, features and advantages of the invention arise from the following description of preferred embodiments with reference to the accompany drawings.

BRIEF DESCRIPTION OF THE DRAWINGS

The sole FIGURE of the drawings shows the oxidation-catalytic separation device of the invention schematically in a section.

DETAILED DESCRIPTION OF THE INVENTION

The oxidation-catalytic separation device in the drawing has an inflow side 1, at which the pressurized gas flow delivered from the compression system flows into a tank 2 which contains an oxidation-catalyst. On the outflow side, the oxidation-catalytic separation device has an outlet 3 at which a pressurized gas flow emerges after having flowed through the oxidation-catalytic separation device, and from which oil and volatile organic components have been separated physically-chemically using an oxidation catalyst.

The oxidation-catalytic separation device, proceeding from the inflow side 1, has at least two chambers 4, 5 with different diameters in the tank 2. As shown, on the inlet side in the tank 2, a first chamber 4 is connected which has a smaller diameter, and which is matched to the smallest pressurized gas through-flow and the slowest speed. This is followed by a second chamber 5 with a larger diameter, in the area of which the outlet 3 is located, and which allows the velocity of the pressurized gas which is flowing through to be slowed down. As shown, the two chambers 4, 5 can be designed as a type of insert to be replaceable in the form of a cartridge system, so that the length and diameter ratios of the chambers 4, 5 can vary and optionally replacement by a chamber insert with a different shape or greater number of chambers of differing sizes.

The first chamber 4 with the smaller diameter is intended mainly for reliable and effective aerosol separation from the pressurized gas flow, while the second chamber 5 with the larger diameter provides a sufficient residence time for residual vapor catalysis by slowing down the continuous pressurized gas flow.

Due to the presence of at least two chambers 4, 5 in the tank 2 for oxidation-catalytic separation, such an oxidation-catalytic separation device can also be used in compression systems that deliver variable pressurized gas amounts with variable velocities. By this definitive separation of the interior of the tank 2 using the chambers 4, 5, the respective chambers can be designed for different amounts and with different diameters in order to undertake effective functional separation of the aerosol separation and residual vapor catalysis under the conditions which are optimum at the time.

In summary, in accordance with the invention, an oxidation-catalytic separation device for removing oil and volatile organic components from pressurized gases of a compression system is provided which, proceeding from the inflow side of a tank which contains an oxidation catalyst, comprises at least two chambers with different diameters and/or lengths. In this way, the chambers can also be matched to the desired main functions with respect to geometrical conditions, especially a first chamber 4 with a smaller diameter being intended for aerosol separation, and a second chamber 5 of greater diameter being intended for residual vapor catalysis. Even for variably operated compression systems, thus, the pressurized gases can be reliably purified using this oxidation-catalytic separation device such that the required and desired degree of purity of a high-quality pressurized gas is obtained.

What is claimed is:

1. An oxidation-catalytic separation device for removing oil and volatile organic components from pressurized gases of a compression system, comprising a tank which contains an oxidation catalyst and through which the pressurized gas flows from an inflow side to an outflow side, wherein the tank includes at least two chambers with at least a first of the at least two chambers having a different diameter, a different length or a different diameter and a different length than a second of the at least two chambers, the first of the at least two chambers effecting aerosol separation and the second of the at least two chambers effecting a residual vapor catalysis, and wherein the at least two chambers are replaceable chamber-forming cartridge inserts, wherein a plurality of different chamber-forming inserts are provided for forming each of said at least two chambers, each of chamber-forming inserts having a different shape or size so that length and diameter ratios of the chambers can be varied by replacement of at least one of the chamber-forming cartridge inserts with another of the chamber-forming cartridge inserts of a different shape or size.

2. An oxidation-catalytic separation device as claimed in claim 1, wherein the at least two chambers have different diameters.

3. An oxidation-catalytic separation device as claimed in claim 2, wherein the tank, at least on the inflow side, comprises a first chamber which has a smaller diameter and which is matched to a smallest expected pressurized gas throughflow and the slowest expected gas velocity, and connected to the first chamber at the outflow side is at least one second chamber that has a larger diameter than the first chamber and which allows the gas velocity to be slowed down.

4. An oxidation-catalytic separation device as claimed in claim 3, wherein the first chamber is adapted mainly for aerosol separation of the compressed gases, and the at least one second chamber is adapted mainly for residual vapor catalysis.

5. An oxidation-catalytic separation device as claimed in claim 1, wherein the inflow side of the tank contains an oxidation catalyst.

6. An oxidation-catalytic separation device for removing oil and volatile organic components from pressurized gases of a compression system, which consists essentially of a tank which contains an oxidation catalyst and through which the pressurized gas flows from an inflow side to an outflow side, wherein the tank consists essentially of at least two chambers with at least a first of the at least two chambers having a different diameter, a different length or a different diameter and a different length than a second of the at least two chambers, and a transitional section connecting the at least first chamber with the second chamber, the first of the at least two chambers effecting aerosol separation and the second of the at least two chambers effecting a residual vapor catalysis, and wherein the at least two chambers are replaceable chamber-forming cartridge inserts, wherein a plurality of different chamber-forming inserts are provided for forming each of said at least two chambers, each of which has a different shape or size so that length and diameter ratios of the chambers can be varied by replacement of at least one of the chamber-forming cartridge inserts with another of the chamber-forming cartridge inserts of a different shape or size.

7. An oxidation-catalytic separation device as claimed in claim 1, wherein at least the first of the at least two chambers has a different diameter and a different length than a second of the at least two chambers.

8. An oxidation-catalytic separation device as claimed in claim 1, wherein at least the first of the at least two chambers has a different length than a second of the at least two chambers.

* * * * *